United States Patent [19]

Hassan et al.

[11] Patent Number: 4,459,924
[45] Date of Patent: Jul. 17, 1984

[54] APPARATUS AND METHOD FOR SPOT PLANTING SEEDLINGS

[75] Inventors: Awatif E. Hassan, Raleigh; William H. Haddock, Garner; Randolph L. Zink, Raleigh, all of N.C.

[73] Assignee: North Carolina State Univ. at Raleigh, Raleigh, N.C.

[21] Appl. No.: 397,461

[22] Filed: Jul. 12, 1982

[51] Int. Cl.³ .............................................. A01C 11/02
[52] U.S. Cl. ............................................ 111/2; 111/89
[58] Field of Search ........................................ 111/2-4, 111/89, 91

[56] References Cited

U.S. PATENT DOCUMENTS

| | | | |
|---|---|---|---|
| 2,227,800 | 1/1941 | Tomlinson | 111/4 |
| 2,789,522 | 4/1957 | Barton | 111/89 X |
| 3,943,863 | 3/1976 | Leonard et al. | 111/89 X |
| 3,972,294 | 8/1976 | Grundstrom et al. | 111/3 |
| 4,182,247 | 1/1980 | Talbott | 111/3 |
| 4,278,035 | 7/1981 | Pickett et al. | 111/2 |
| 4,323,019 | 4/1982 | Haddock | 111/2 |
| 4,364,316 | 12/1982 | Paladino | 111/3 |

FOREIGN PATENT DOCUMENTS

| | | | |
|---|---|---|---|
| 1117376 | 2/1982 | Canada | 111/3 |
| 354982 | 6/1922 | Fed. Rep. of Germany | 111/89 |
| 654620 | 12/1937 | Fed. Rep. of Germany | 111/2 |
| 3004900 | 8/1980 | Fed. Rep. of Germany | 111/89 |
| 3032447 | 3/1981 | Fed. Rep. of Germany | 111/2 |
| 7811699 | 6/1980 | Netherlands | 111/2 |
| 50020 | 1/1932 | Norway | 111/89 |

Primary Examiner—James R. Feyrer
Attorney, Agent, or Firm—Daniel McConnell

[57] ABSTRACT

An apparatus and method for spot planting seedlings in which planting instrumentalities intermittently engage ground and plant seedlings at spaced spots. The planting instrumentalities include a site preparation pulverizer, seedling insertion dibble plates, and an impacting packer head for compressing soil. Mechanism is provided for sequentially actuating the various planting instrumentalities and for reducing to zero the relative traversing velocity between the planting instrumentalities and a spot of ground engaged thereby.

10 Claims, 40 Drawing Figures

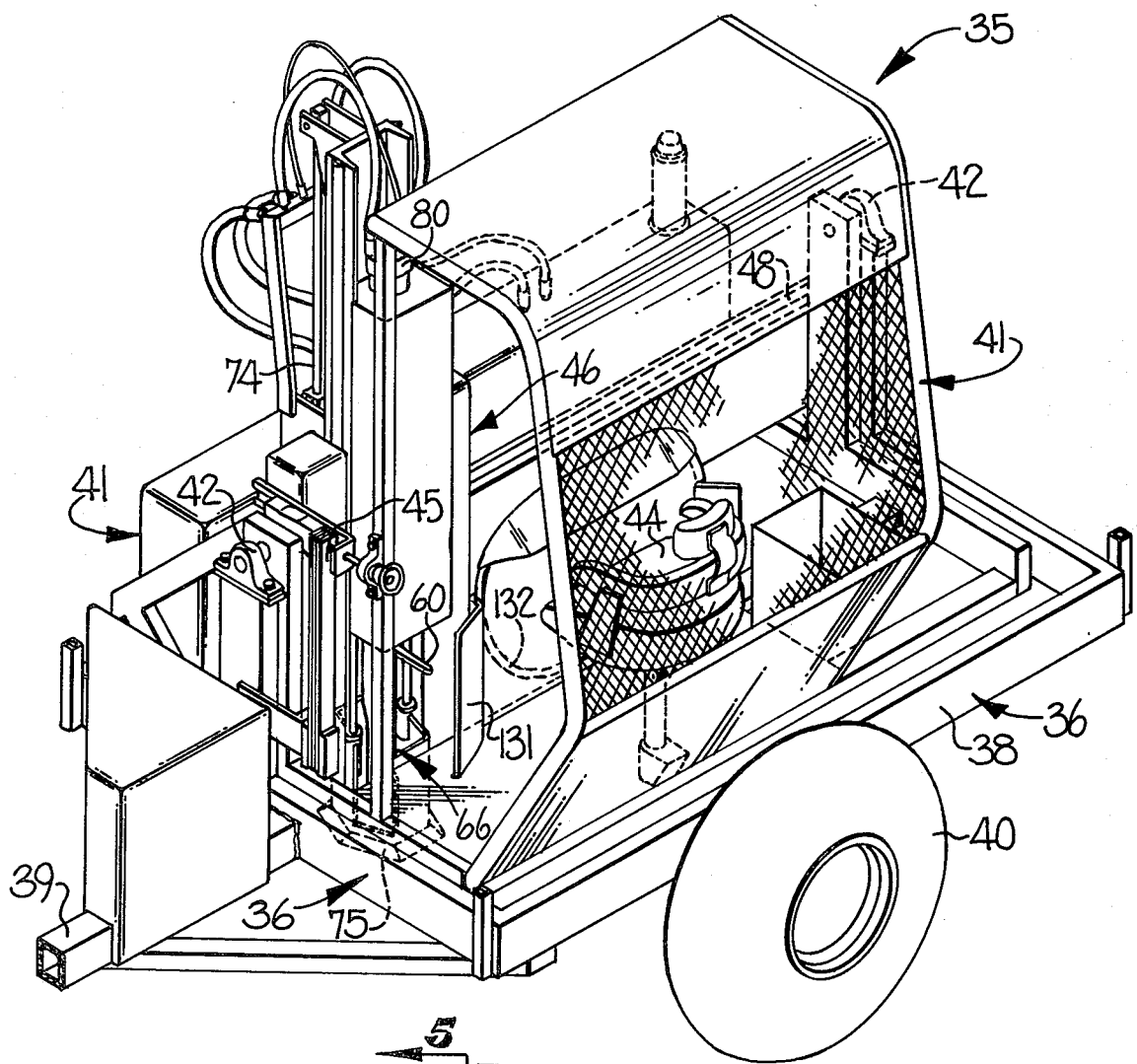
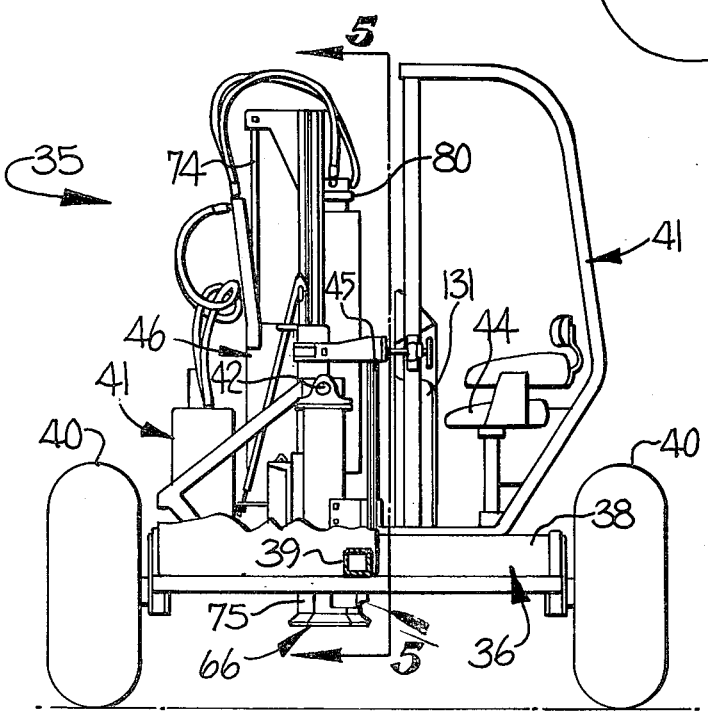
Fig-1
Fig-2

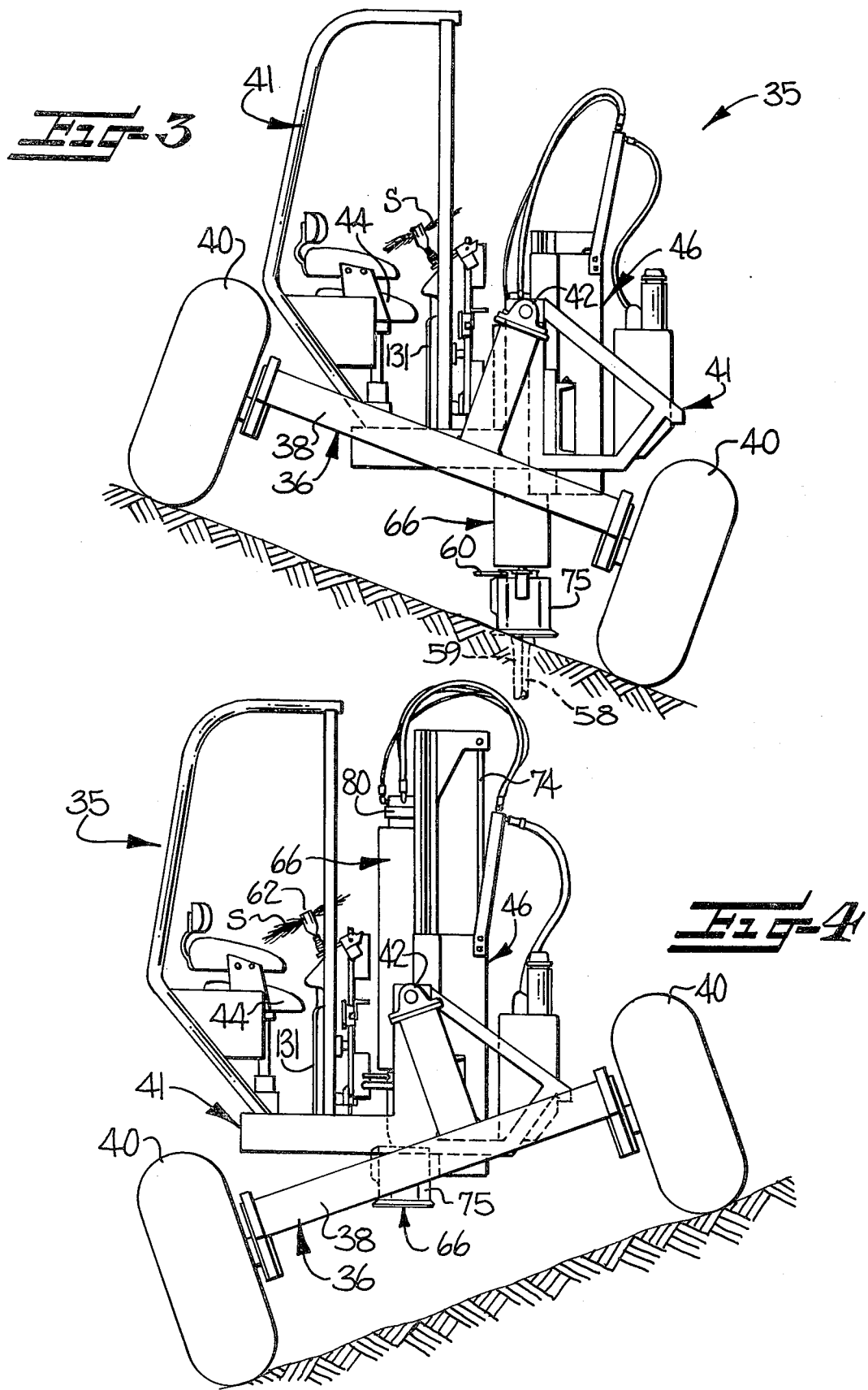

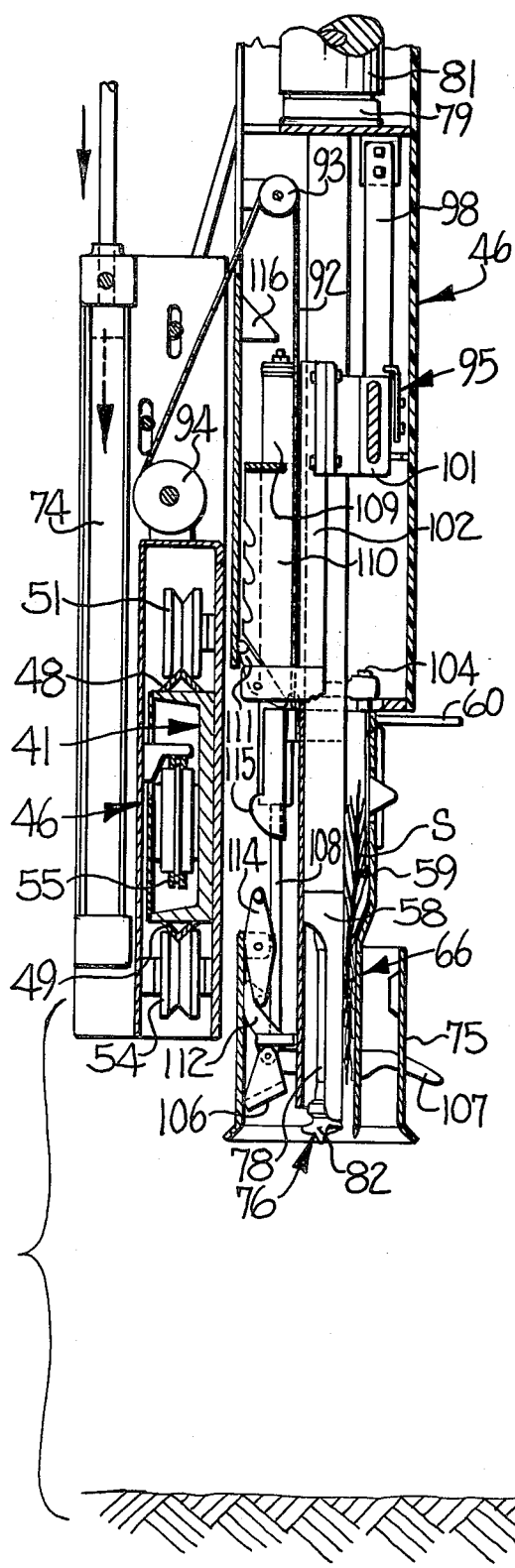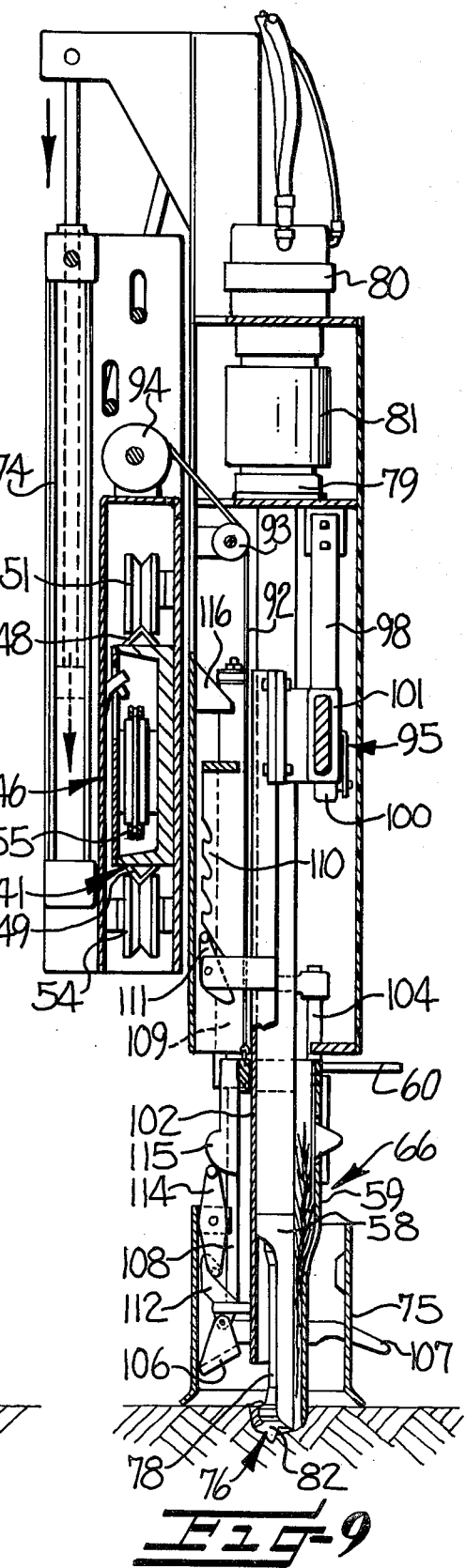
Fig-8
Fig-9

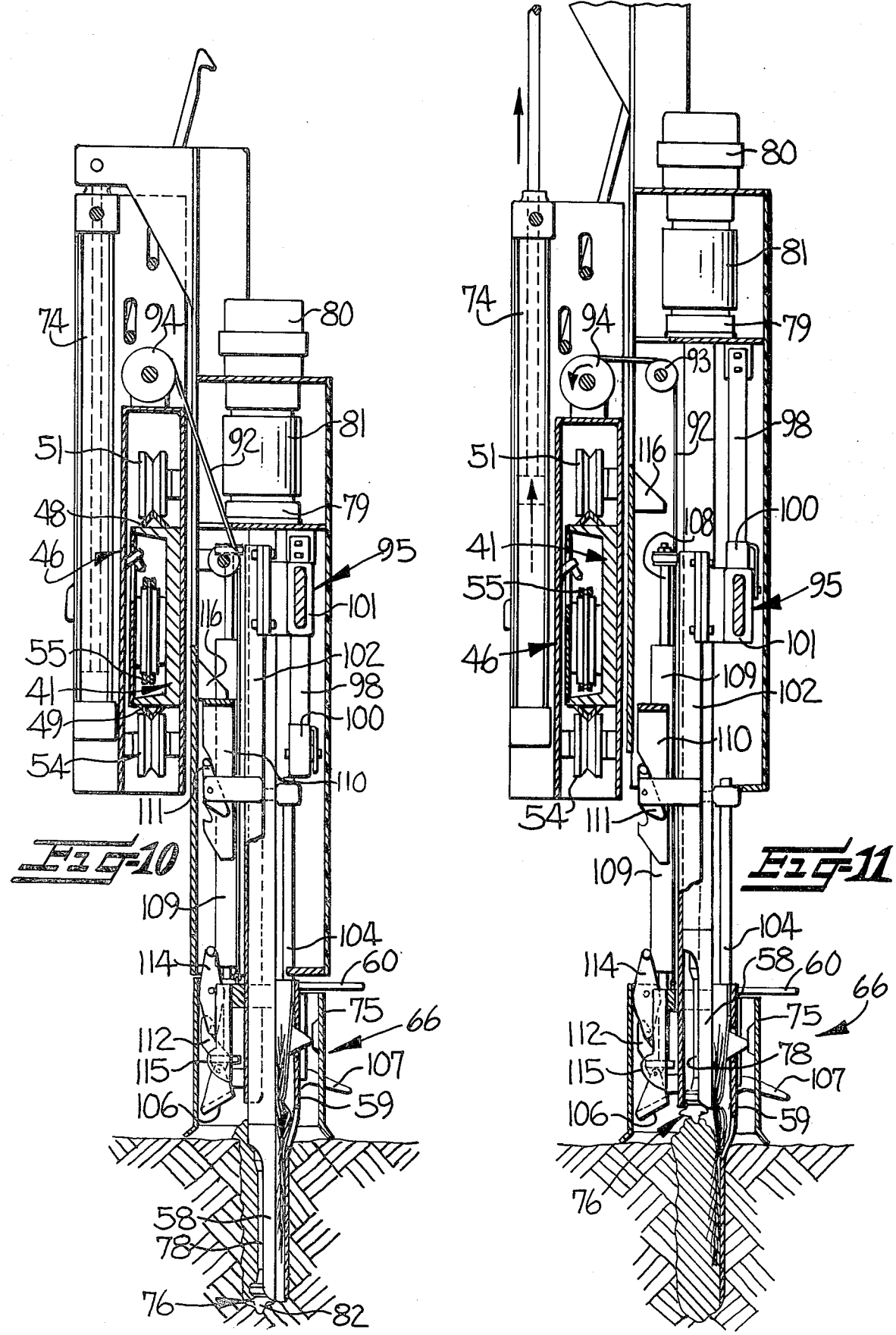

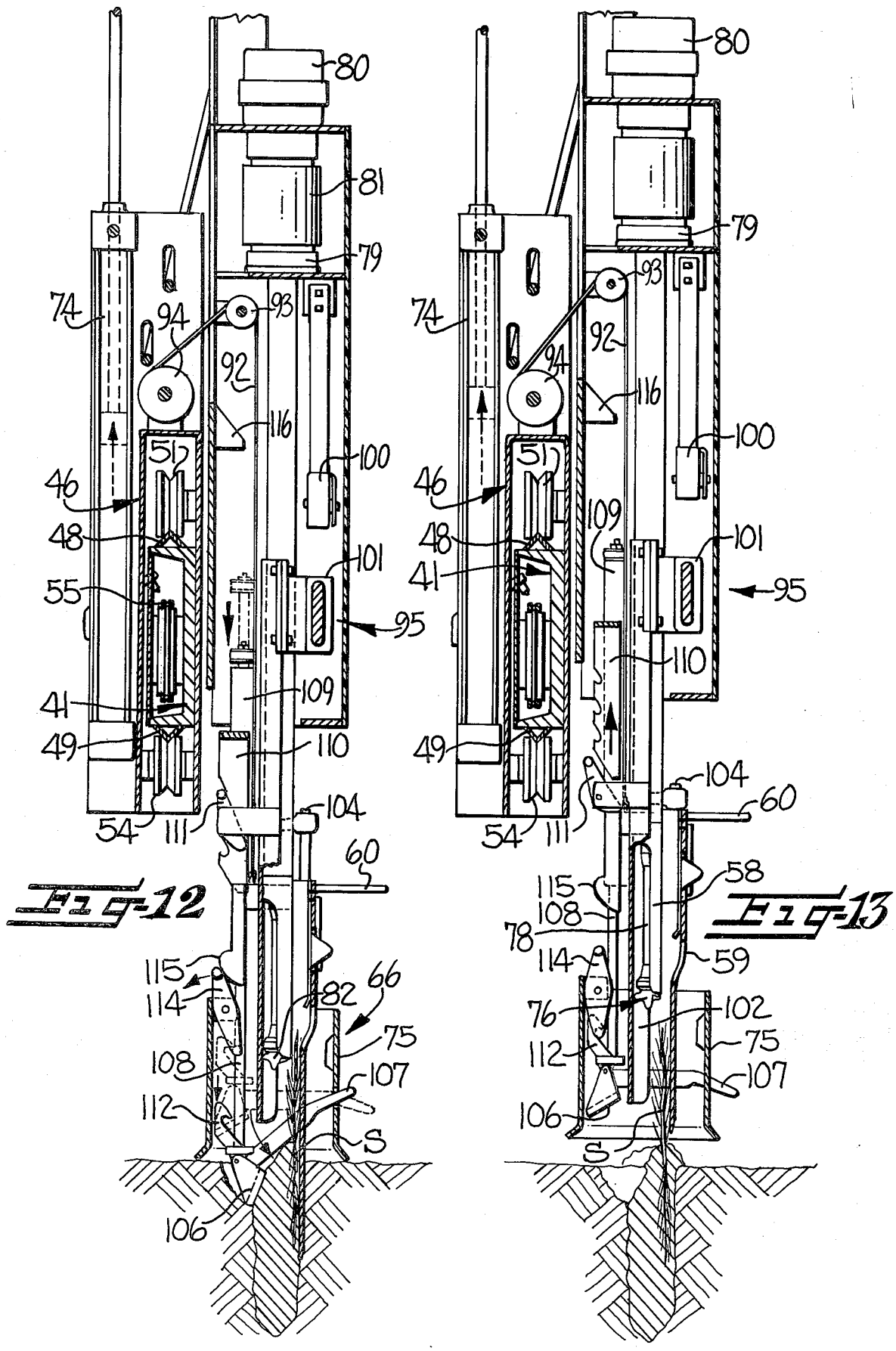

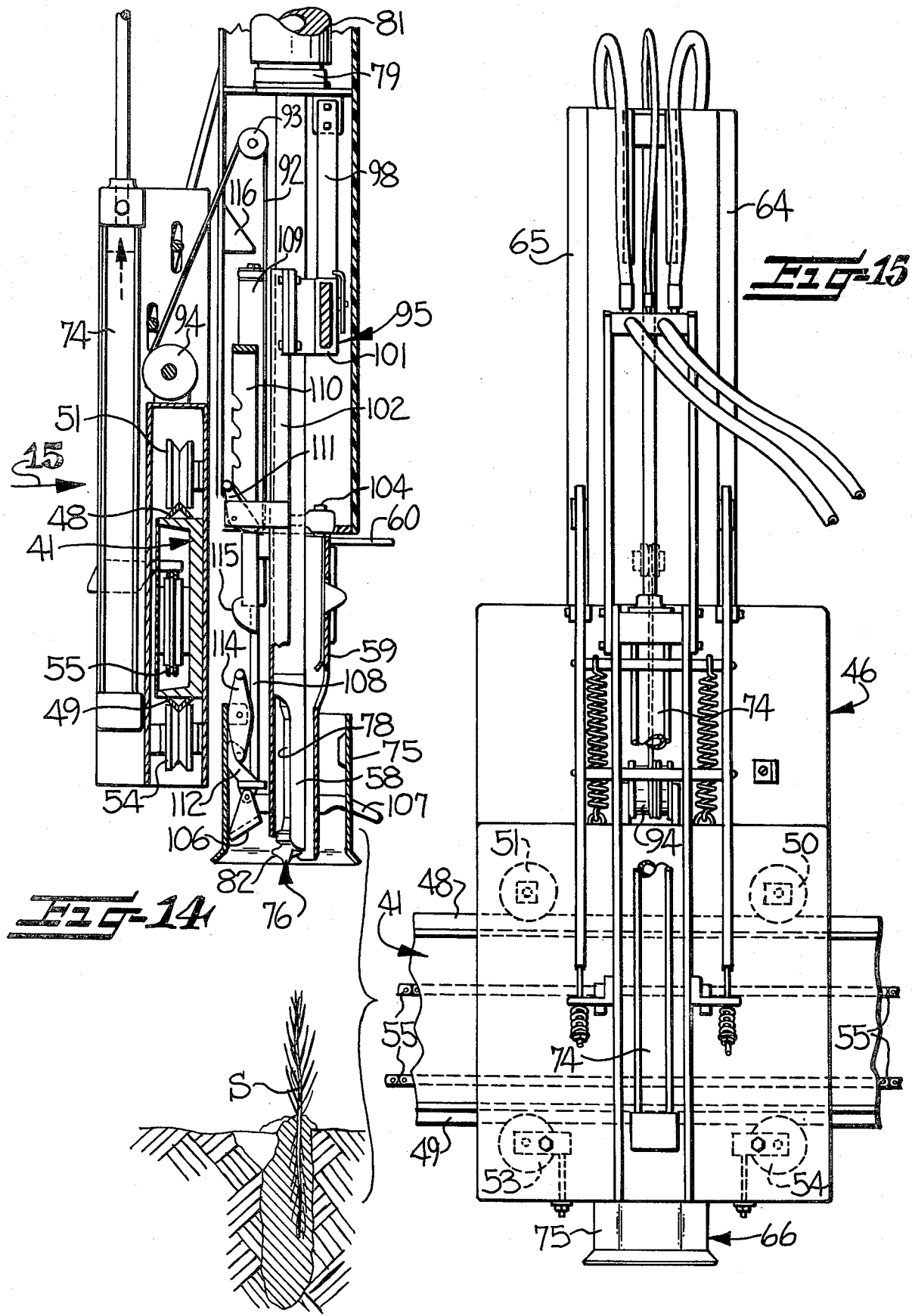

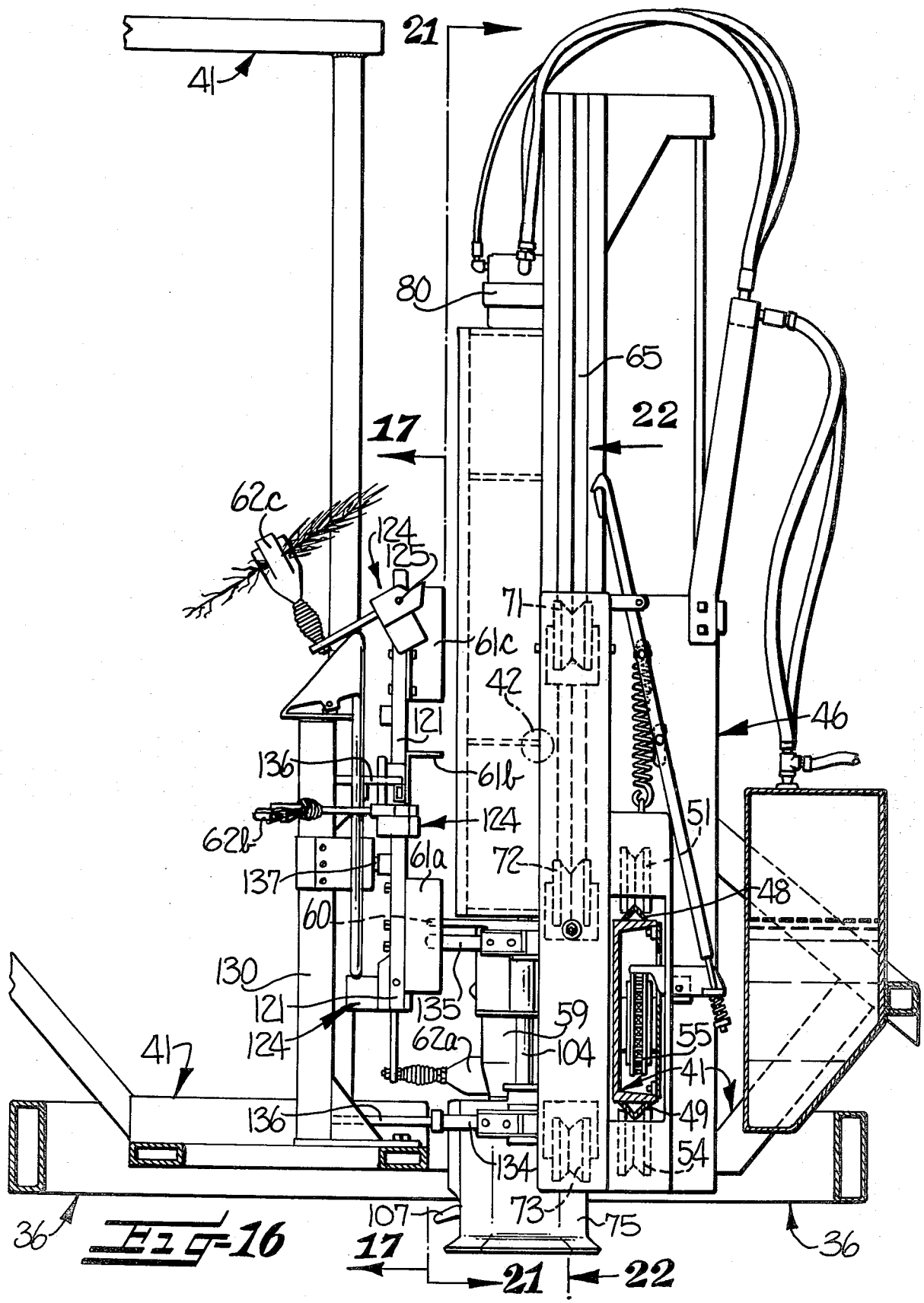

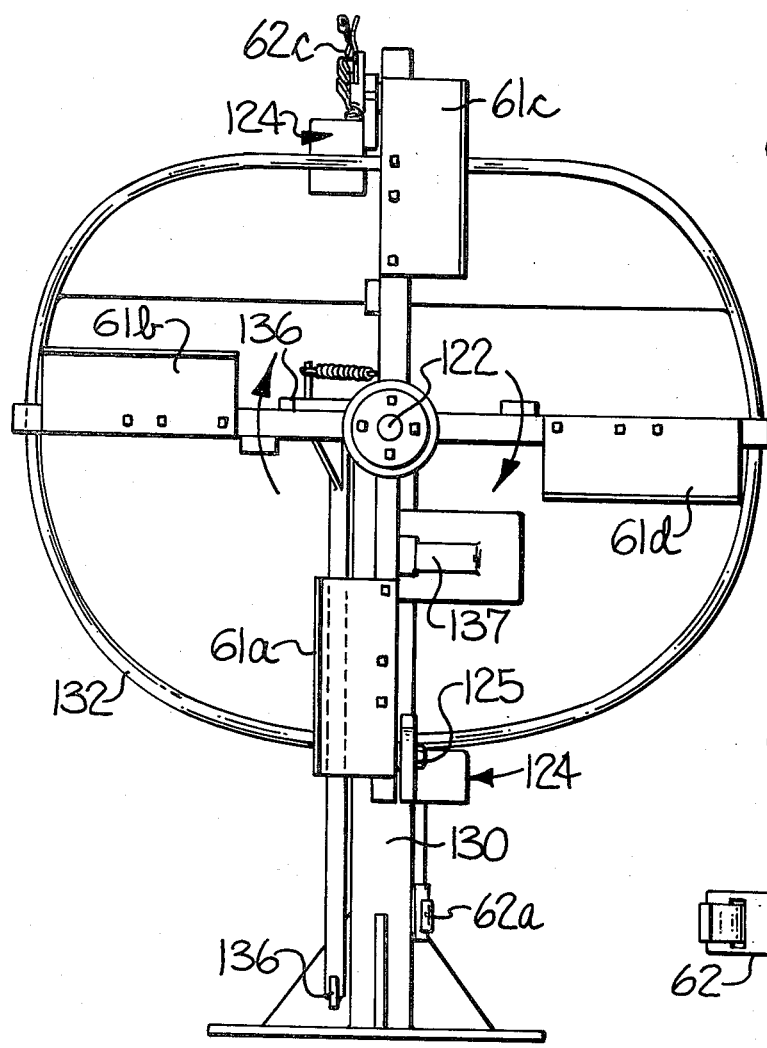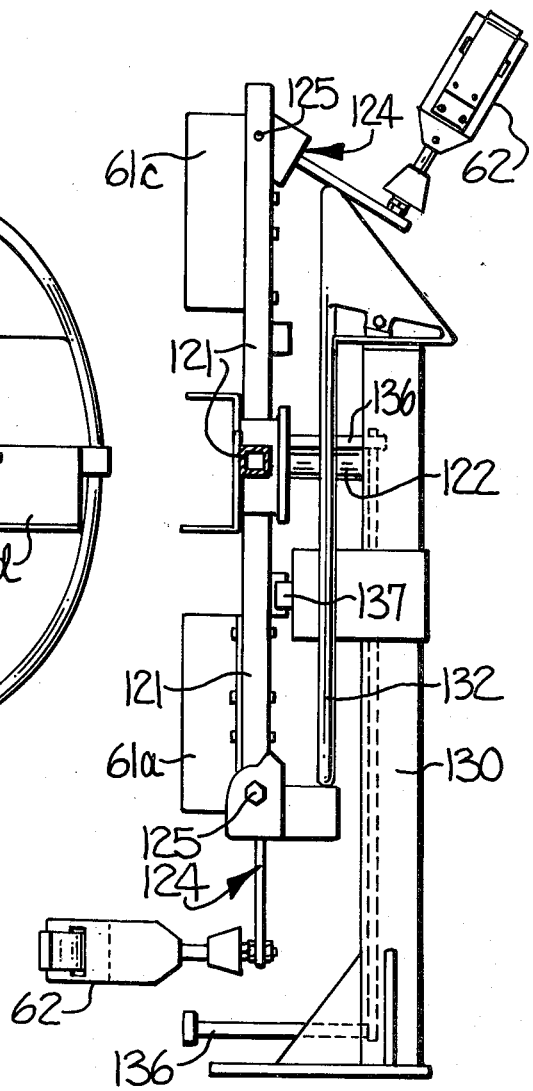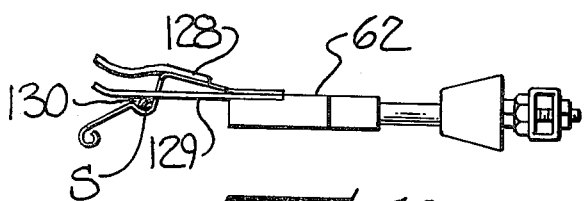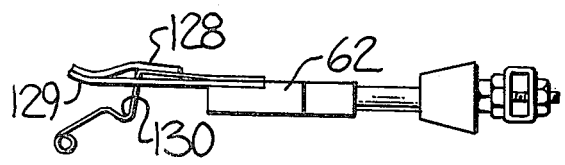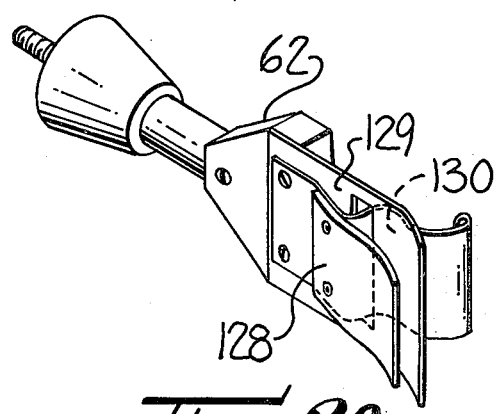

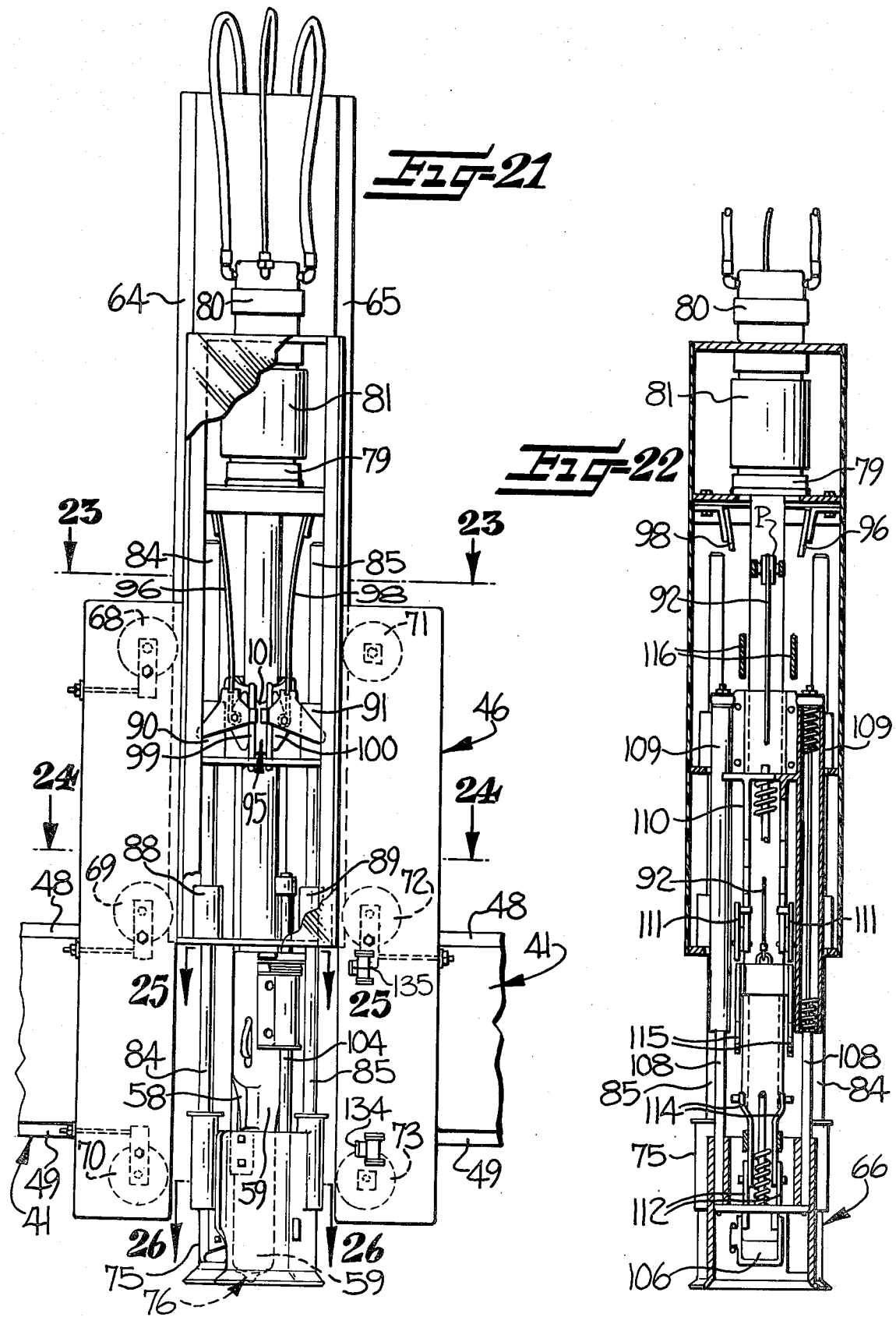

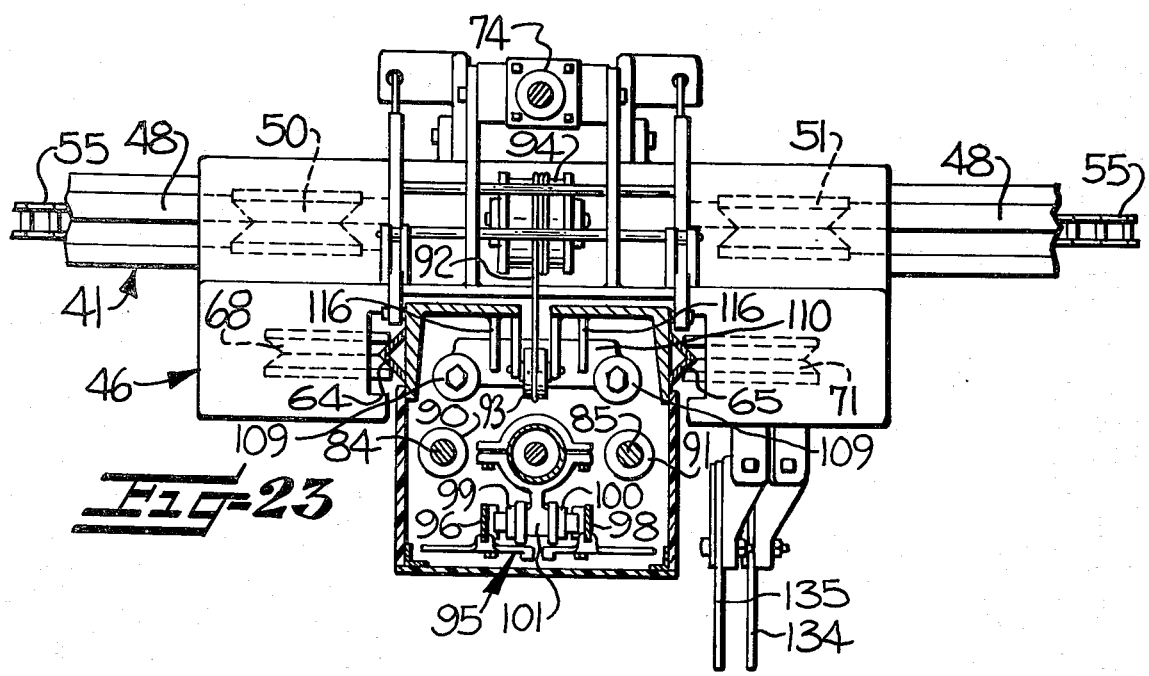
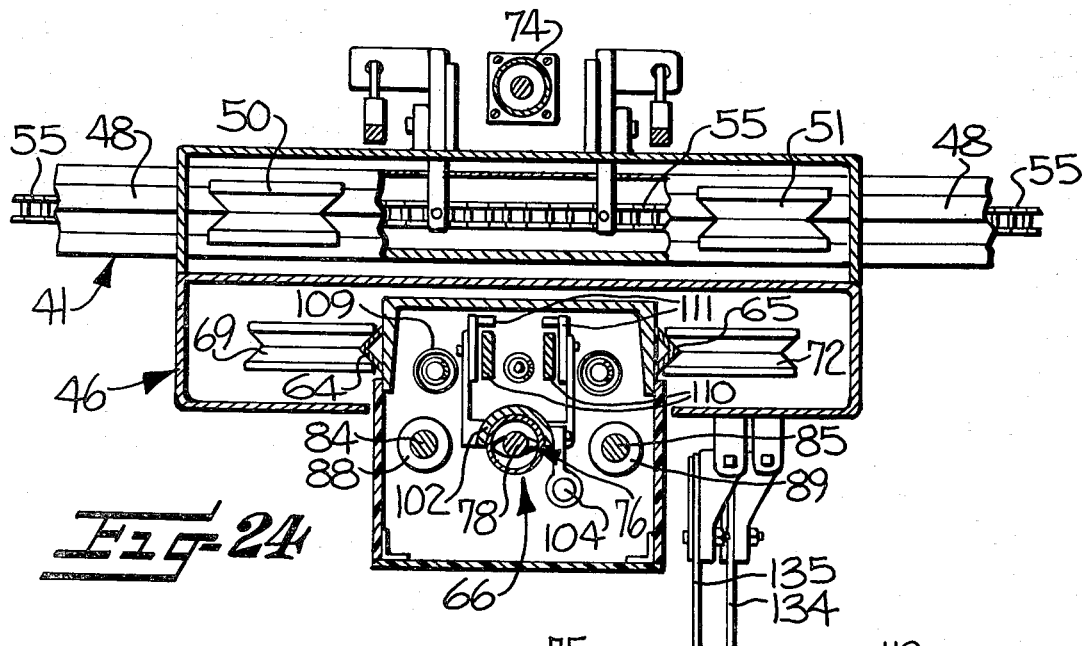
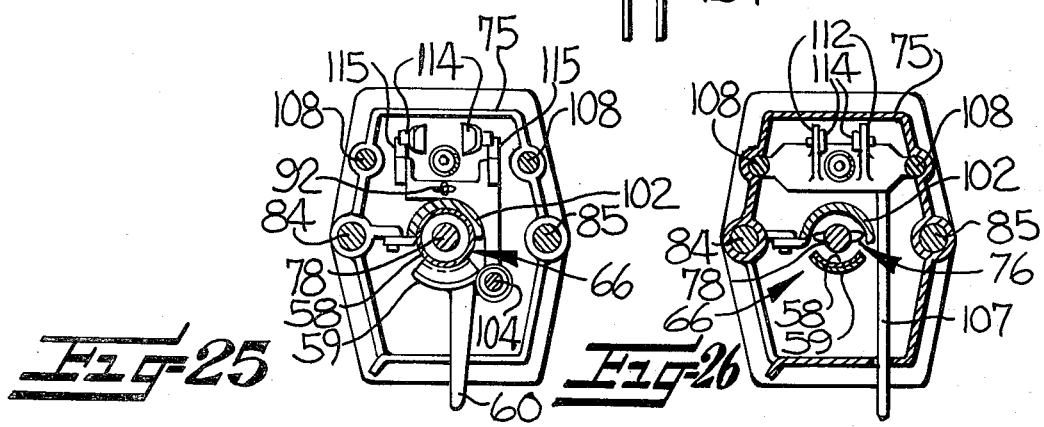

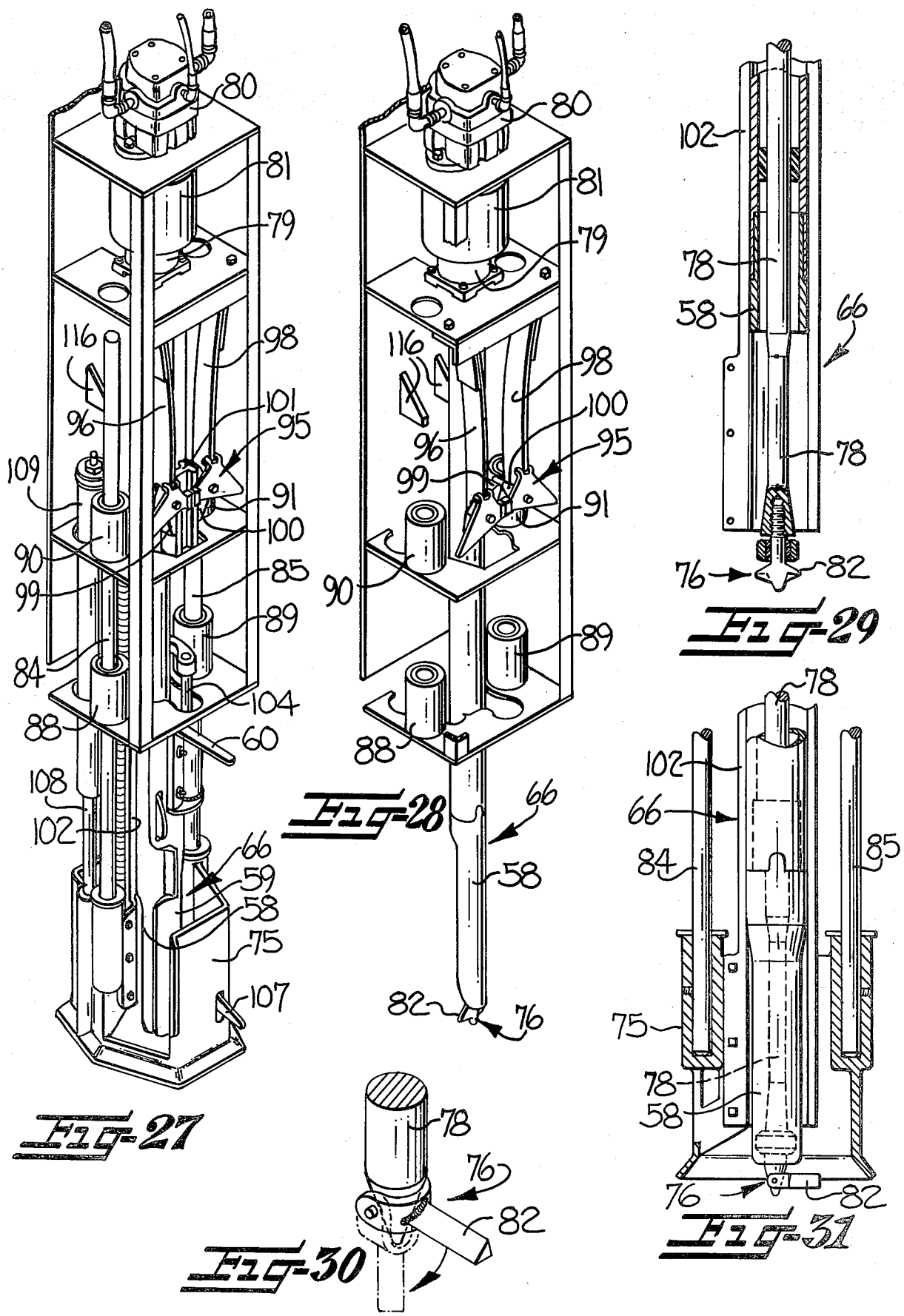

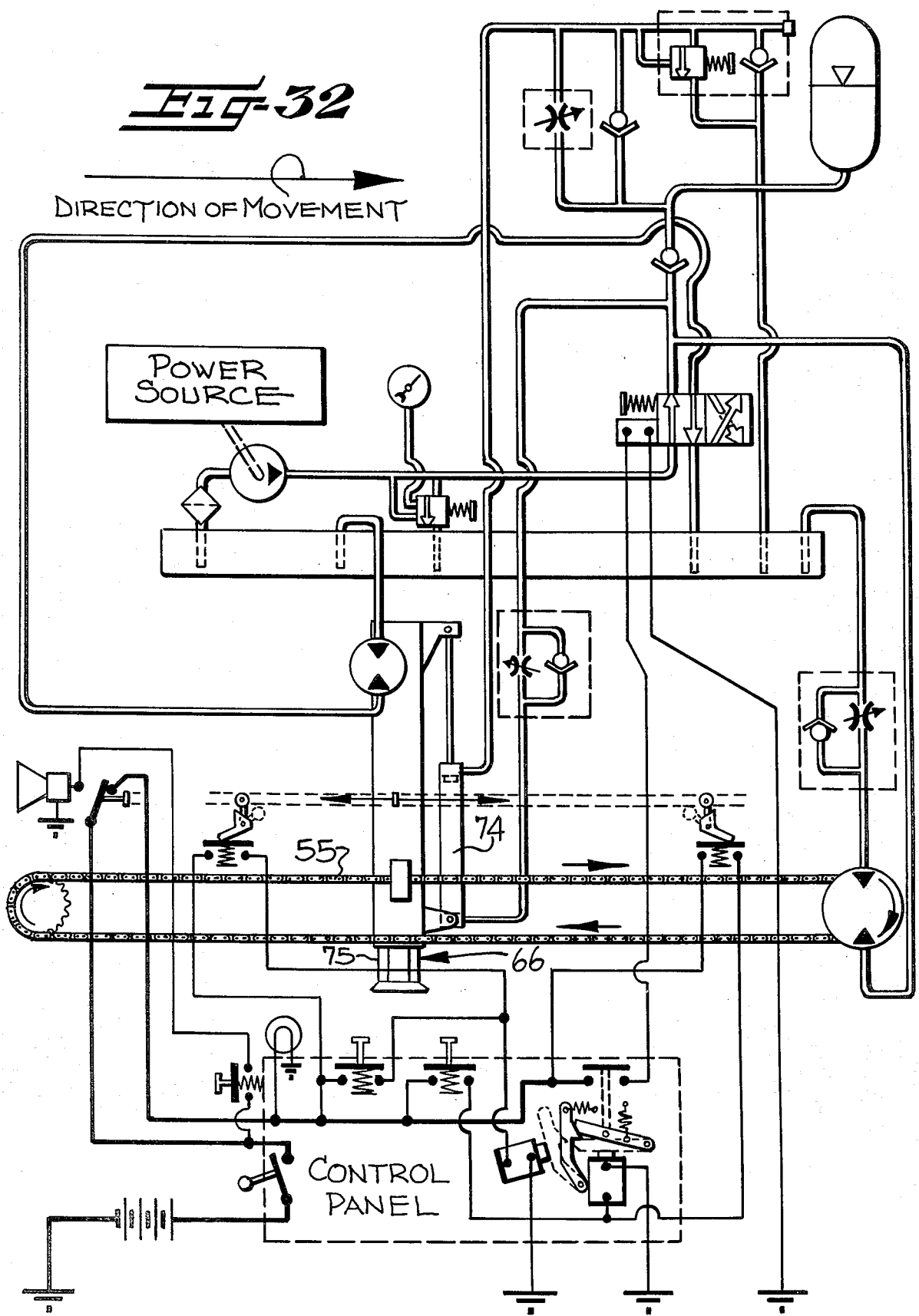

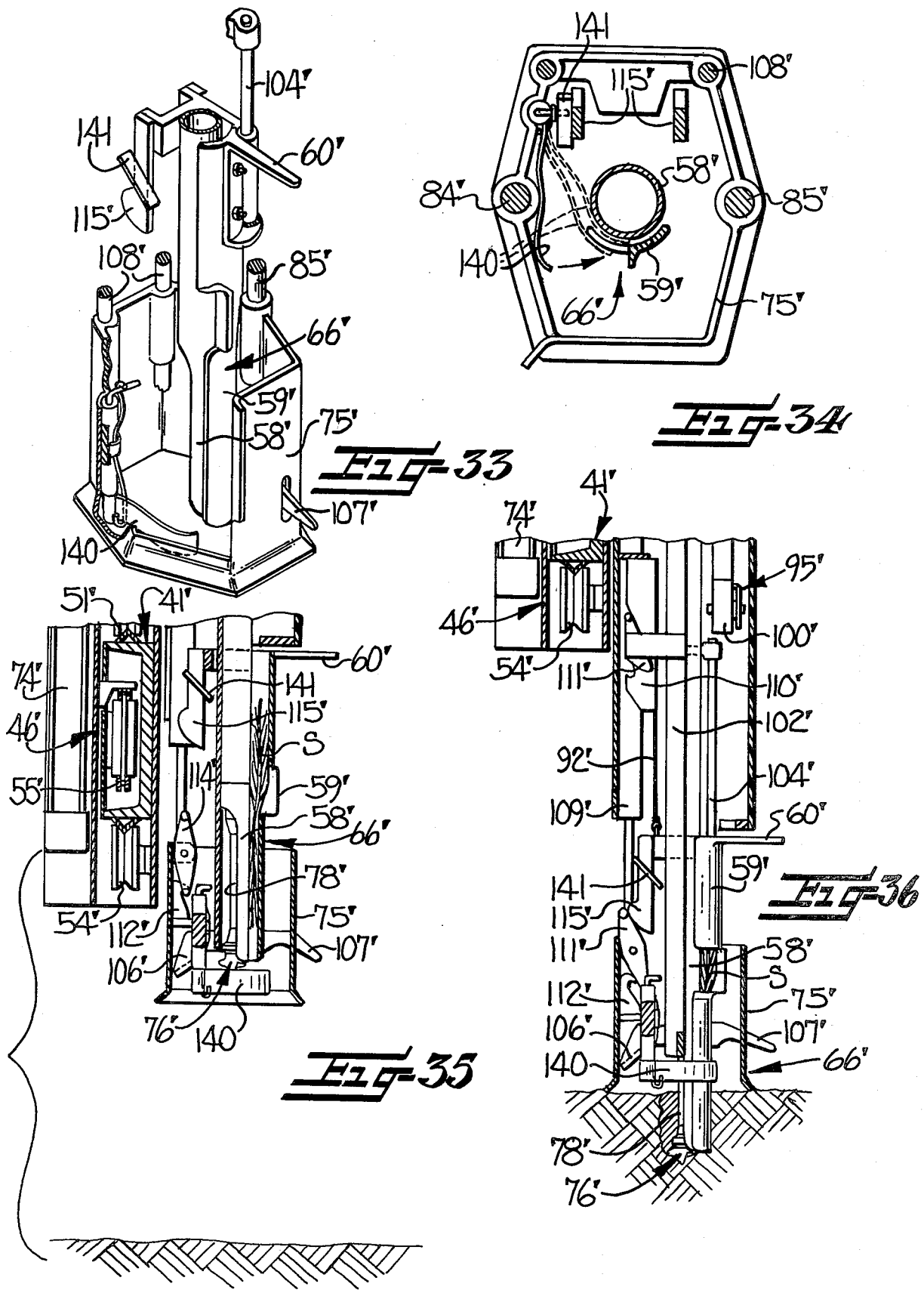

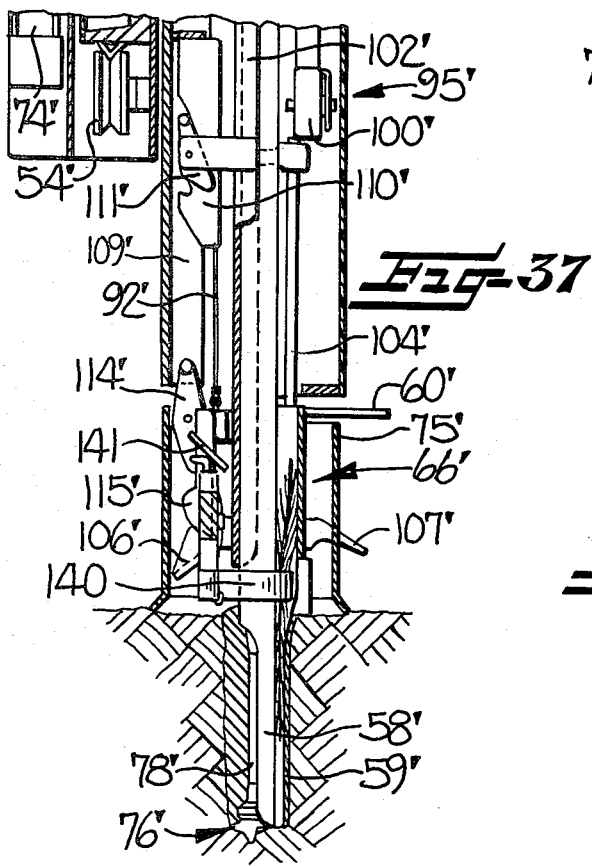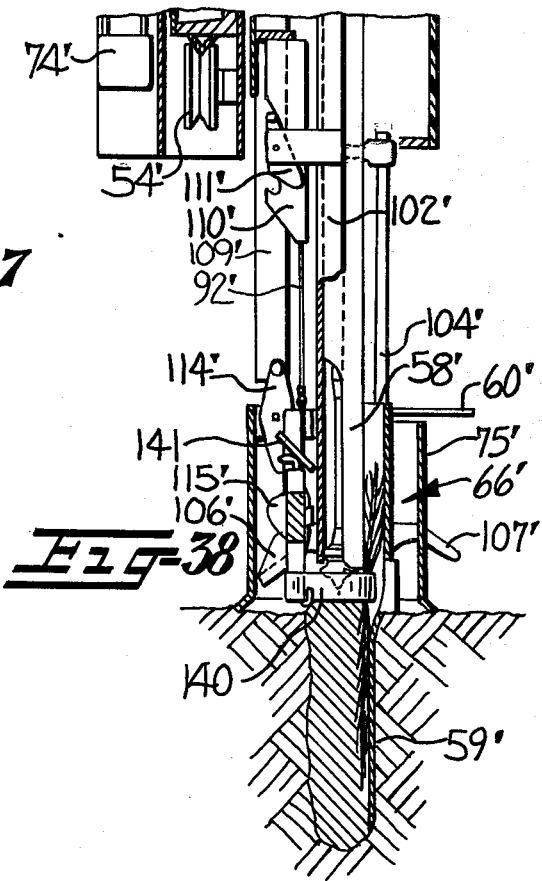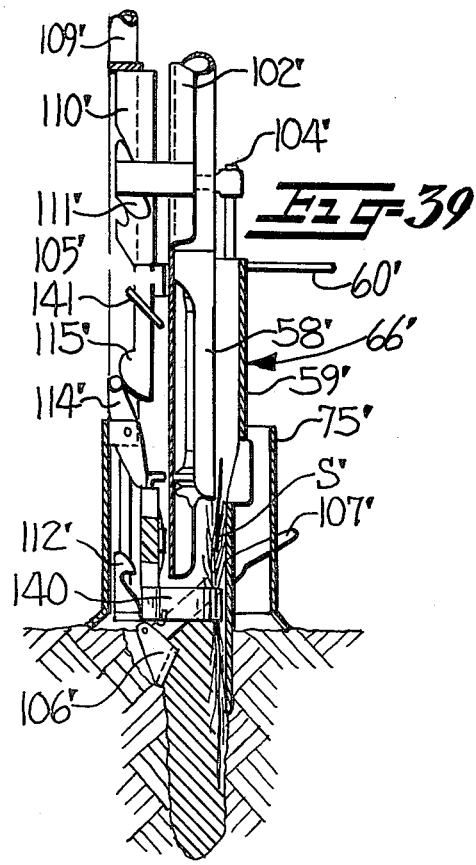

APPARATUS AND METHOD FOR SPOT PLANTING SEEDLINGS

FIELD AND BACKGROUND OF INVENTION

This invention relates to the spot planting of seedlings, and particularly to apparatus and methods useful in forestry practices for such spot planting of seedlings.

Reforestation practices have heretofore involved seeding nursery beds for initial plant growth, lifting seedlings from the nursery beds, and planting seedlings in areas undergoing reforestation. Similar practices have been followed in connection with certain more general agricultural plantings, as may be known to persons of appropriate skill in the applicable arts. Particularly in forestry practices, seedlings are planted on preselected spacings which have been, in many instances, most easily accomplished by individual spot planting done by a forester or the like. That is, locating and planting seedlings as desired has best been done by the actions of a knowledgeable individual.

While there have been a large number of reasons for such manual labor in spot planting seedlings, many attempts have been made to mechanize spot planting methods with a view to increasing the acreage which may be planted within a particular time interval while decreasing the physical labor involved. To the extent that mechanized methods and apparatus have been developed heretofore, such methods and apparatus are dangerous, of limited usefulness, or require special handling of seedlings. As a consequence, mechanized planting has not achieved significant success or attained wide adoption.

BRIEF DESCRIPTION OF INVENTION

With the aforementioned difficulties and deficiencies in mind, it is an object of the present invention to accomplish spot planting of seedlings in accordance with a method and through the use of apparatus by which planting may be accomplished on a variety of terrains and soils. In realizing this object of the present invention, it is contemplated that a particular cooperation between a transport arrangement mounting planting mechanism for traversing movement across ground to be planted and the planting mechanism itself will accommodate a variety of terrains and soil conditions. The transport provision made, in accordance with the present invention, particularly comprises a carriage for traversing ground to be planted and having fore and aft ends, and a movable frame mounted on the carriage for moving fore and aft thereof and thereby for reducing to zero the relative fore and aft velocity between planting mechanism mounted on the movable frame and spots of ground engaged by the planting mechanism.

Yet a further object of the present invention is to facilitate successful planting of seedlings through the cooperation of planting instrumentalities adapted for operation in a variety of soils. In realizing this object of the present invention, provision is made for preparing ground to receive planting of a seedling, for planting a seedling in the ground, and for compressing soil about a planted seedling. By providing for such a sequence, in the environment of the present invention, successful mechanized planting practices are made possible.

As more specifically stated, the present invention contemplates the spot planting of seedlings in a controlled and safe manner over a variety of types of terrain and soil by the provision of a carriage for traversing ground to be planted, a movable frame mounted on the carriage for moving fore and aft thereof, a site preparation auger mounted on the frame for rotation about a vertical axis and for axial vertical movement for penetration into and withdrawal from ground to be planted, dibble plate members mounted on the frame for movement one relative to the other between seedling gripping engagement one with the other and seedling release separation one from the other, the dibble plates being mounted for vertical movement along an axis parallel and adjacent to the auger for penetration into and withdrawal from ground to be planted, an impacting hammer mounted on the frame for pivotal movement between a cocked position and a tripped position and for striking the surface of ground adjacent a location of penetration thereof by the plate members for compressing soil about a planted seedling, and actuator means for sequentially actuating the respective planting instrumentalities. Through the provision of components as briefly set forth hereinabove, mechanized planting procedures are safely and effectively carried out.

BRIEF DESCRIPTION OF DRAWINGS

Some of the objects of the invention having been stated, other objects will appear as the description proceeds, when taken in connection with the accompanying drawings, in which--

FIG. 1 is a perspective view of an apparatus embodying the present invention;

FIG. 2 is an elevation view, from the front and partially in section and broken away, of the apparatus of FIG. 1 as the apparatus traverses essentially level terrain;

FIG. 3 is an elevation view from the rear of the apparatus of FIGS. 1 and 2, as the apparatus traverses terrain sloping transversely downward from left to right in the figure;

FIG. 4 is a view similar to FIG. 3, showing the apparatus traversing terrain of opposite slope to that illustrated in FIG. 3;

FIGS. 8 through 14 are a series of elevation views, partially in section, taken generally along the line 8—8 in FIG. 5 and illustrating the sequence of operational events occurring during planting of a seedling by the apparatus of FIGS. 1 through 7;

FIG. 15 is an elevation view of portions of the apparatus of the present invention, taken generally as indicated by the arrow 15 in FIG. 14;

FIG. 16 is an elevation view, partially in section, taken generally along the line 16—16 in FIG. 5;

FIG. 17 is an elevation view of a portion of the apparatus illustrated in FIGS. 7 and 16, taken generally along the line 17—17 in FIG. 16;

FIG. 18 is an elevation view taken generally at right angles to FIG. 17 and showing components of the apparatus of the present invention employed in seedling capture as illustrated in FIGS. 6, 7 and 16;

FIGS. 19 and 20 are respectively a plan view and a perspective view of a portion of the apparatus of FIGS. 17 and 18;

FIG. 21 is an elevation view taken generally along the line 21—21 in FIG. 16, and illustrating portions of the apparatus of the present invention;

FIG. 22 is a view similar to FIG. 21, taken generally along the line 22—22 in FIG. 16;

FIG. 23 is a plan view, partially in section, taken along the line 23—23 in FIG. 21;

FIG. 24 is a view similar to FIG. 23, taken generally along the line 24—24 in FIG. 21;

FIGS. 25 and 26 are views similar to FIGS. 23 and 24, taken along respective lines 25—25 and 26—26 in FIG. 21;

FIG. 27 is a stripped, skeletal perspective view of certain of the components of the planting instrumentalities in accordance with the present invention and which are shown in FIGS. 21 through 26;

FIG. 28 is a stripped, skeletal perspective view of certain of the components illustrated in FIG. 27;

FIG. 29 is an enlarged, sectional elevation view of an auger shaft portion of the apparatus of FIGS. 27 and 28;

FIG. 30 is an enlarged perspective view of portions of the apparatus of FIGS. 27 through 29;

FIG. 31 is an elevation view, in section, through components of the apparatus illustrated in FIGS. 27 through 30;

FIG. 32 is a schematic representation of a hydraulic circuit used in the apparatus of this invention;

FIG. 33 is a view similar to FIG. 27, showing a modified form of certain of the components of an apparatus in accordance with the present invention;

FIG. 34 is a view somewhat similar to FIGS. 25 and 26, through the components of FIG. 33; and FIGS. 35 through 39 are a series of views corresponding to FIGS. 8 through 12 and illustrating the apparatus of FIGS. 33 and 34.

DETAILED DESCRIPTION OF INVENTION

Figure 5:
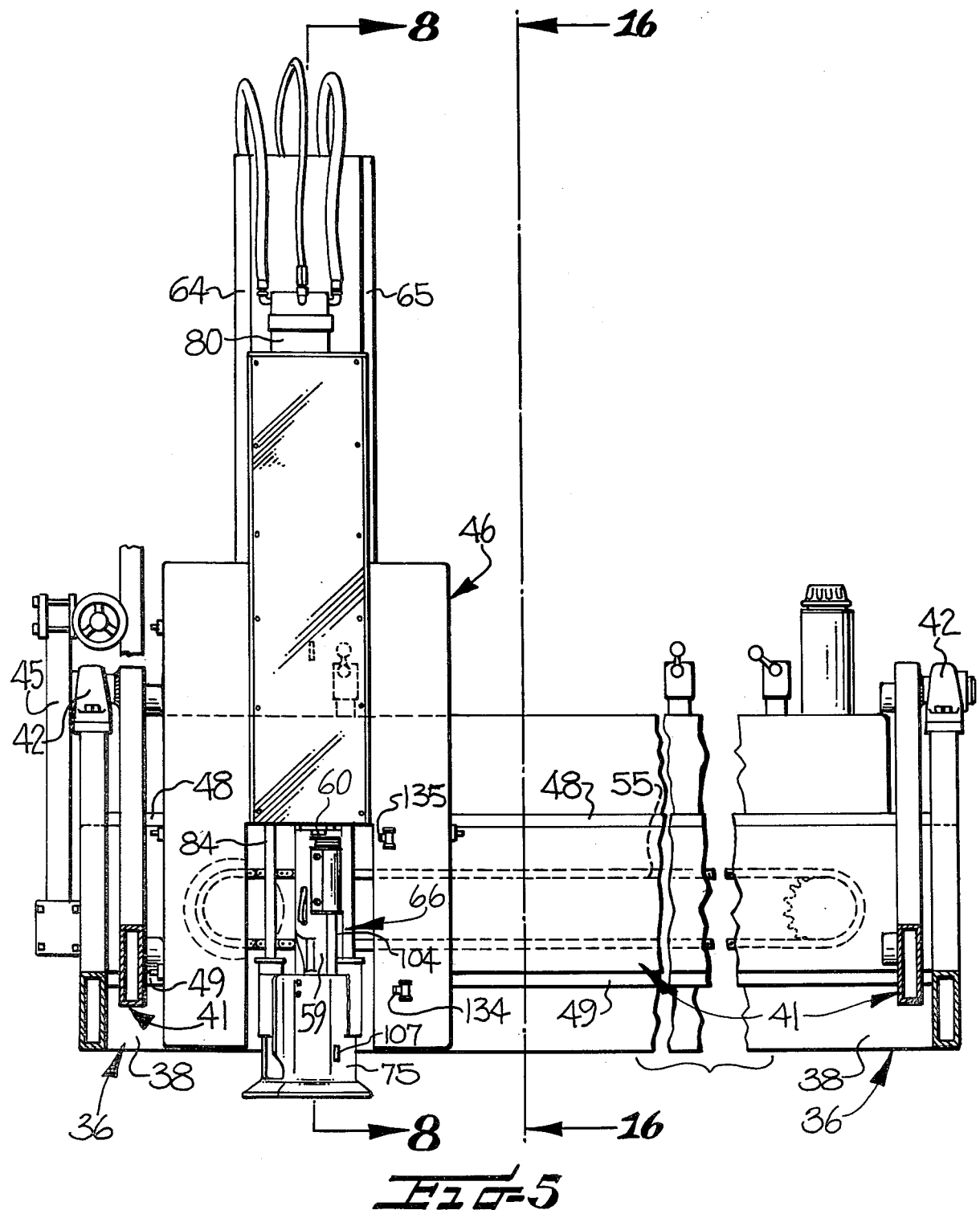
FIG. 5 is an elevation view, partially in section, taken along the line 5—5 in FIG. 2 and showing components of the apparatus of the present invention.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings, an apparatus for spot planting seedlings in accordance with the present invention is there shown and is generally indicated at 35. The apparatus includes a carriage means generally indicated at 36 for traversing ground to be planted and having fore and aft ends. As here identified, the carriage means 36 comprises two portions, the first being a wheeled carrier 38 having a tongue portion 39 adapted for connection to an appropriate towing vehicle such as a tractor and ground engaging wheels 40. As will be appreciated, the wheeled carrier 38 may be made self-propelled, should that be deemed desirable. Mounted on the carrier 38 for pendulum movement relative thereto about a fore and aft axis is a carriage cage generally indicated at 41. The cage 41 is mounted for movement by a pair of bearings 42, each of which engages a corresponding stub shaft. For purposes to be pointed out more fully hereinafter, the carriage cage 41 includes an operator seat 44 which may be occupied by an operator during use of the apparatus 35. An adjustable balancing spring generally indicated at 45 accommodates variation in the weight of individual operators, while permitting the carriage cage 41 to move in a pendulum-like fashion about the fore and aft axis defined by the bearings 42 and the shafts which pass through those bearings. Such pendulum-like movement of the carriage cage 41 maintains the carriage cage 41 essentially upright or vertically oriented, even though the terrain traversed may slope from side to side (as shown in FIGS. 3 and 4).

Mounted on the carriage cage 41 is a movable frame means generally indicated at 46. As pointed out more fully hereinafter, the movable frame means 46 mounts planting means for intermittently engaging ground traversed by the carriage means 36 and for planting seedlings at spaced spots. The present description will turn to the details and operation of the planting means hereinafter.

In accordance with the present invention, the frame means 46 and the planting means cooperate for reducing to zero the relative fore and aft velocity between the engaged ground spots and the planting means by movement of the frame means and the planting means aftward of the carriage means 36 during ground engagement and seedling planting. This is accomplished, in the specific form of the present invention shown herein, by the inclusion, in the carriage cage 41, of a pair of vertically spaced fore and aft rail members 48, 49. The upper fore and aft rail member 48 is engaged by a pair of guide wheels or rollers 50, 51, while the lower rail 49 is similarly engaged by another pair of guide rollers or wheels 53, 54. By the engagement of the guide wheels 50, 51, 53, 54 and the rails 48, 49, the movable frame means 46 and the planting means mounted thereon are capable of moving fore and aft of the carriage cage 41 and thus of the carriage means 36. A return chain 55, driven by an appropriate motive means such as a hydraulic motor, is provided for moving the frame means 46 forwardly of the carriage means 36.

During operation, and as described more fully hereinafter, the planting means mounted on the movable frame means 46 is brought into engagement with a spot of ground to be planted and, with such engagement, is free to move aftward of the carriage means 36 in such a manner as to reduce to zero the relative velocity between the planting means and the ground. As a consequence, the cycle of planting operations pointed out more fully hereinafter occurs without relative movement between the planting means and the ground in the direction of movement of the carriage means 36. As planting is completed and the planting means are withdrawn from engagement with the ground, the drive chain 55 restores the movable frame means 46 to a forward position (as in FIGS. 1 and 5) in preparation for the next cycle of planting.

Figure 7:
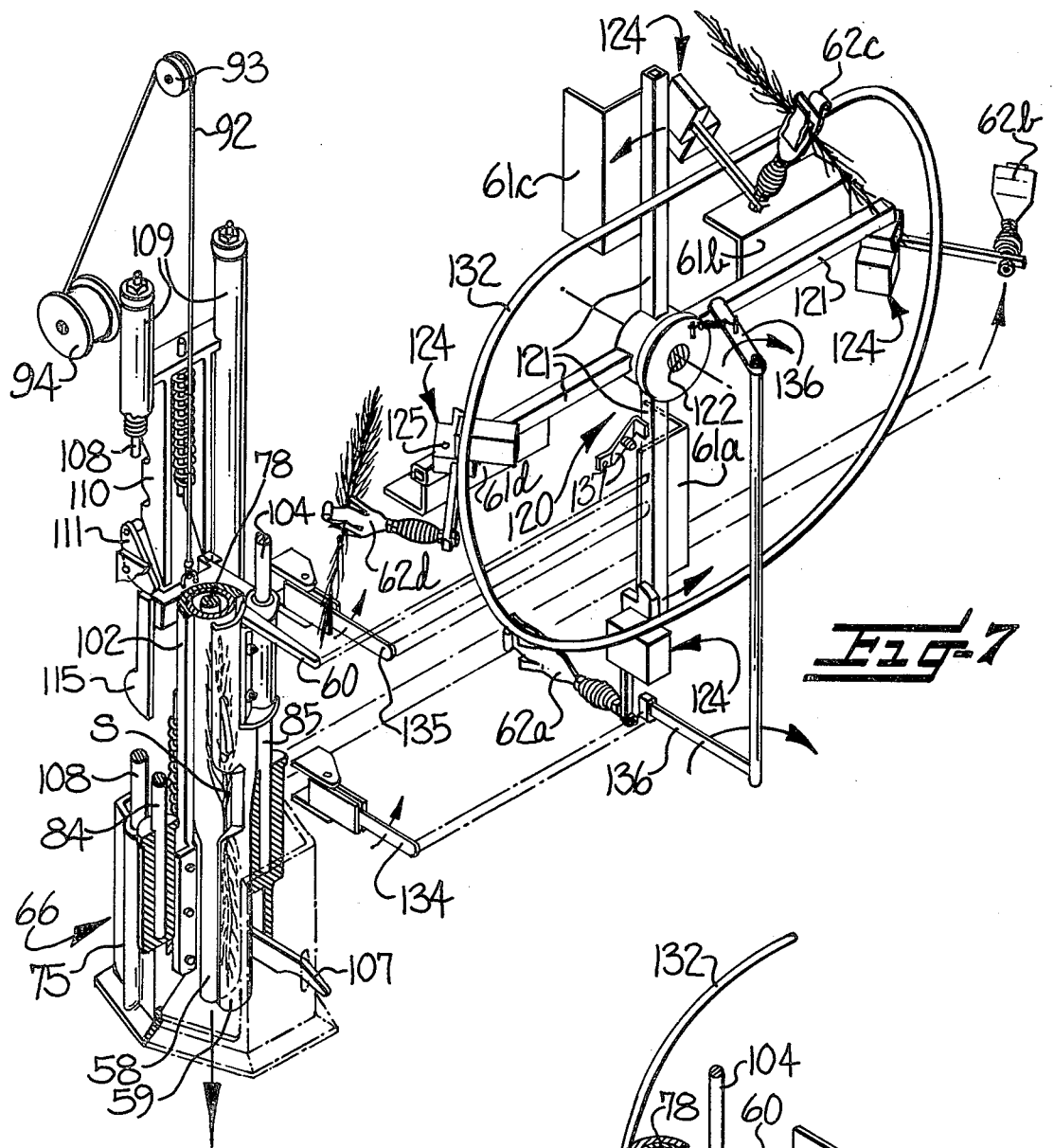
FIG. 7 is a view similar to FIG. 6, illustrating somewhat schematically the cooperation of certain of the elements of the apparatus of the present invention relating to the capture of seedlings.
Figure 6:
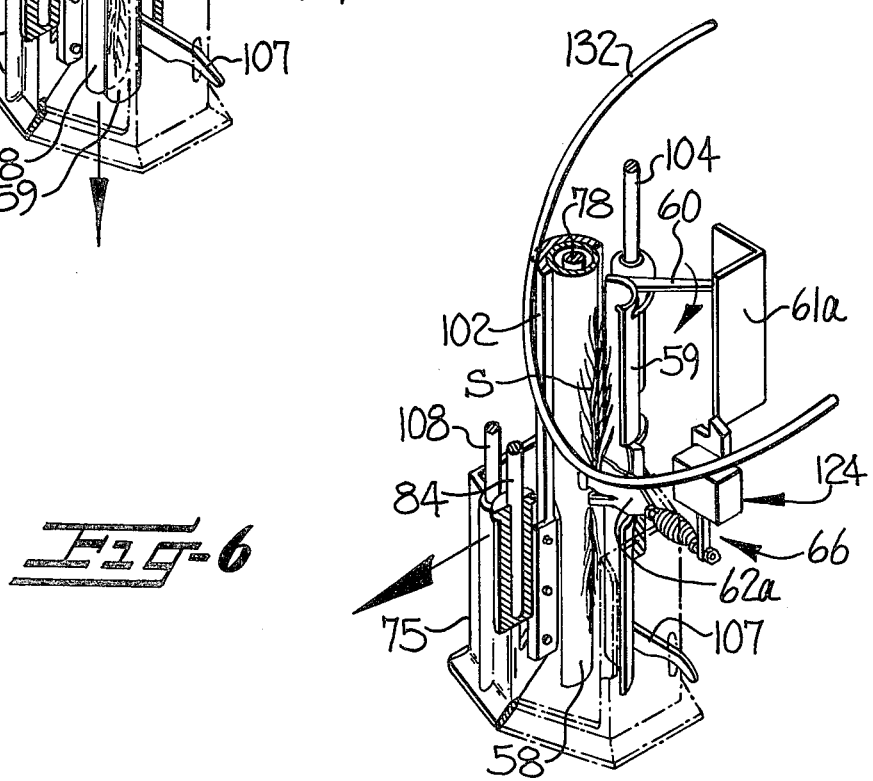
FIG. 6 is a perspective view, partly broken away and partly in section, of certain components of the apparatus of FIGS. 1 through 5, illustrating the capture of a seedling by dibble plate members of the apparatus.

The planting means, as described more fully hereinafter, has planting instrumentalities which in general comprise site preparation means for preparing ground to receive planting of the seedling, seedling insertion means for planting a seedling in the ground, packer means for compressing soil about a planted seedling, and actuator means for sequentially actuating the site preparation means and the seedling insertion means and the packer means. The sequence of operation of those means, and many of the components thereof, will be more clear from considering FIGS. 6 through 14, within which FIGS. 8 through 14 are a particular sequence of views illustrating engagement of the planting means with a spot of ground. The sequence may be viewed as beginning (in FIG. 6) with the capture of a seedling S between dibble plate members 58, 59 as the frame means 46 moves forwardly of the carriage means 36. Such capture occurs as a pivoting outer dibble plate member 59 having an opening lever 60 engages a camming bracket 61a of a seedling feed mechanism (FIGS. 6 and 7). With such movement, the dibble plate members are pivoted open, in the fashion of an opening door, for capture of a seedling held in a spring clip 62a. As the planting means moves forwardly, the dibble plates 58, 59 are opened, the seedling S is stripped from the spring clip 62a and the dibble plate members 58, 59 pivot closed to hold the seedling.

These actions occur as the planting means is in an elevated position (FIG. 8), out of engagement with ground traversed by the carriage means. Upon the next signaling for planting, which either may be by means of an automatic control system or by operator selection, a planting head mounted on the movable frame means 46 begins vertically downward movement (toward the position of FIG. 9) for engagement with the ground.

More particularly, the movable frame means 46 has a pair of vertically extending rail members 64, 65 on which a planting head generally indicated at 66 is mounted by a plurality of grooved guide wheels 68, 69, 70, 71, 72 and 73. The planting head 66 is moved vertically by the action of a vertically acting master cylinder 74. In moving from the elevated or raised position of FIGS. 5 and 8 toward the ground engaging position of FIG. 9, hydraulic fluid is admitted to the master cylinder 74 to move the planting head 66 vertically downwardly.

As the head moves downwardly, the first component to engage a spot on the ground at which a seedling is to be planted is a shroud 75 which, as is pointed out by the drawings and the description which follows, partially encloses the lowermost end of certain elements of the planting means which, in accordance with the present invention, is mounted on the movable frame means of the apparatus 35. The shroud 75 encloses a rotatable auger means which functions as a site preparation means for preparing ground to receive planting of a seedling by penetrating and loosening soil. The rotatable pulverizer means, generally indicated at 76, comprises a pulverizer shaft 78 mounted for rotation about a vertical axis and for axial vertical movement with the planting means 66 as referred to hereinabove. The pulverizer shaft 78 is mounted by appropriate bearings including a thrust bearing 79 (FIGS. 27 and 28) and is connected, adjacent the upper end thereof, with rotary motive means for rotating the shaft 78. The rotary motive means preferably takes the form of a hydraulic motor 80 and a flywheel 81. By the inclusion of the flywheel 81, added momentum is made available for penetration of the shaft 78 into hard or rocky soils.

The pulverizer means 76 additionally includes a blade means 82 mounted on the shaft 78 for rotation therewith and for engaging and loosening soil penetrated by the shaft means. Preferably, the blade 82 is a pivoted blade as illustrated in FIG. 30.

Upon the planting means engaging ground being traversed by the carriage means 36 (FIG. 9), the shroud 75 maintains position at the surface of the engaged spot of ground, while continued vertically downward movement of the planting means 66 and rotation of the shaft 78 as driven by the motor 80 and flywheel 81 causes the pulverizer means to penetrate and loosen soil at the spot to be planted (FIG. 10).

In movement of the planting means 66 from the fully retracted position of FIG. 8 to the position illustrated in FIG. 10 and in which the spot of ground to be planted has been penetrated, several other events occur, as will be hereinafter described.

It is to be noted that the shroud 75 is positioned by a pair of shroud rails 84, 85 which extend vertically parallel to the pulverizer shaft 78 and move in shroud rail bushings 88, 89, 90, 91. The position of the shroud 75 relative to other elements of the planting head 66 is in part controlled by a cable 92 and associated reel 94 and by a shroud brake assembly generally indicated at 95 and formed by a pair of leaf springs 96, 98 carrying brake members 99, 100 which engage a shroud brake shoe 101. The shroud brake shoe 101 is mounted on and moves vertically with a split center tube 102. As pointed out more fully hereinafter, the split center tube 102 additionally functions as a mount or support for other elements of the apparatus of this invention, most notably including a dibble plate guide rod 104 on which the outer, concave, friction dibble plate 59 is mounted for rotational movement. The shaft 104 additionally carries a cable plate 105, to which the cable 92 is attached. By the provision of this mounting arrangement for the cable plate, a limited differential in movement of the shroud 75 and the concave dibble plate member 59 is permitted as pointed out more fully hereinafter. Further, by the provision of the cable 92 and reel 94 and shroud brake 95, the shroud 75 when brought into contact with a spot on the ground to be planted is stopped from proceeding further vertically downward and, by being forced against the ground, reduces to zero the relative fore and aft velocity between the engaged ground spot and the planting means 66, initiating aftward movement of the movable frame means as described hereinabove. The remainder of the elements of the planting means 66 may proceed downward, inserting the dibble plates 58, 59 and the pulverizer means 76 into the ground. Should the dibble plates 58, 59 and/or the pulverizer 76 encounter an obstacle before penetrating to a predetermined depth on the order of about six inches, the shroud brake 95 does not release and the planting operation is aborted until the next cycle. In such event, the seedling S (FIG. 6) is retained.

Should the site preparation means and seedling insertion means penetrate more than the predetermined depth, then the shroud brake 95 will be released and planting will occur. Penetration to such a depth is indicated by the distinctions between FIGS. 9 and 10.

As briefly mentioned hereinabove, the planting means 66 includes packer means for compressing soil about a planted seedling. In the form illustrated, the packer means comprises an impact head 106 mounted on and connected with a lever member 107 and a pair of packer rods 108. The packer rods 108 are housed within packer spring tube assemblies 109 to which is attached a return ratchet 110 engagable by a return latch 111. The impact head 106 is also connected with an activator catch hook 112 and an activator latch member 114 which may be tripped (as described more fully hereinafter) by a cam 115.

In operation, and as illustrated in the sequence of views from FIG. 8 through FIG. 15, downward movement of the planting means 66 causes a packer spring loading abutment 116 to engage an end of the return ratchet 110 (compare FIGS. 8 and 9 with FIG. 10) as the planting instrumentalities penetrate into the soil. With such engagement, the packer spring contained within the packer spring tube assembly is loaded with a force acting downwardly on the impacting head 105. However, the impacting head 106 is restrained against movement under the force of the spring by engagement of the activator hook 112 and the activator latch 114. As loading of the springs occurs, the cam 115 is moved to a position below the packer activator latch 114 (compare FIGS. 9 and 10).

As penetration of the planting instrumentalities into an engaged spot of ground occurs (FIG. 10) the springs of the packer assembly are maintained in a compressed state by engagement of the latches described hereinabove. The main frame of the planter means is then lifted by the hydraulic cylinder 74 (toward the position of FIG. 11) with the pulverizer means 76 and the smooth, convex, inner dibble plate member 58 being lifted leaving the shroud 75, the packer 106, and the concave, outer, friction dibble plate 59 and seedling S in place. As the frame moves upward to a predetermined distance, the convex dibble plate 58 and pulverizer means 76 clear the ground and the cable 92 becomes taut. With continued upward movement of the planter frame, the cable 92 causes the outer, concave dibble plate 59 to be pulled upward at twice the speed of upward movement of the frame of the planter. As the friction dibble plate moves upward a predetermined distance, a cam 115 forming a portion of the plate 105 moves a packer latch member 114, causing the spring energy stored in the springs within the tubes 109 to drive the impacting head 106 downwardly into the ground (FIG. 12). As upward movement of the assembly continues, the cam 115 is brought into engagement with the return latch member 111, disengaging the return latch (FIG. 13) and withdrawing the impact head 106 into the shroud 75. At such time, the cable plate 105 to which the cable 92 is secured becomes effective to lift the shroud 75 with the outer dibble plate 59. At a predetermined distance above the ground (FIG. 14) the planting mechanism reaches a fully retracted position at which point the planting head is ready to receive another seedling and is located toward the aft end of the carriage means 36. The movable frame means 46 is then drawn forward through the action of the chain 55 briefly described above.

More particularly, a pair of latch engaging members are mounted on each side of the vertically movable planting means 66 and function to engage pairs of latch rods. The rods are biased in a downward direction by springs (FIGS. 15 and 16) and have secured adjacent the lower ends thereof chain engaging dogs or latches. The chain engaging dogs are pivotally mounted to the movable frame means 46. As the cylinder 74 raises the planting means 66 to its uppermost position, the rods are raised causing the chain engaging dogs to insert pins on their outer ends between rollers of the chain 55, thus propelling the movable frame means 46 from aft to fore position. An appropriate actuator is operated in timed sequence to reverse the movement of the cylinder 74, releasing the pins from the chain. The movable frame means 46 is then freed to move from fore to aft when the planting means 66 engages the ground as described hereinabove.

As the planting instrumentalities are drawn forward, a seedling is inserted into the planting instrumentalities as briefly described above with reference to FIGS. 6 and 7. That description will now be amplified, with particular attention to FIGS. 16 through 20 where a particular mechanism for inserting seedlings into the planting head is illustrated. As will become clear from the discussion which follows, the insertion mechanism relies upon the actions of an operator who may be seated in the operator seat 44. The use of such an operator provides an opportunity for assuring that the mechanism of the apparatus of this invention operates correctly. However, it is contemplated that more automated seedling handling arrangements may be developed by those who become familiar with the present invention. Accordingly, it is to be understood at the outset of the following description that it is not limiting upon the forms of insertion mechanism developed or used.

The particular form illustrated uses an insertion carousel 120 (FIGS. 16 through 18) formed by a plurality of arms 121 which extend radially outwardly from a rotational center defined by a stub shaft 122. Each arm has a pivoted pendulum portion at an outboard end and generally indicated at 124 which is mounted for pivotal movement about a corresponding axis 125 which is perpendicular to the central rotational axis 122. Each pendulum portion 124 has a spring clip 62a, 62b, 62c, 62d, as briefly described hereinabove. One spring clip 62a is shown in greater detail in FIGS. 19 and 20 where it may be seen that a spring member 128 is biased against a plate member 129 so as to define therebetween an opening 130 which may grip a seedling. Each of the arms 121 additionally mounts a contact plate 61a, 61b, 61c, 61d for indexing triggers mounted on the movable frame means 46. The carousel 120 is mounted on a standard 130 carried by the cage 41 so as to be positioned adjacent the operator seat 44, and includes an operator shield 130 and a pivotable member guide rod 132. The guide rod 132 moves the pendulum pivoting assemblies 124, with the assistance of gravity, between a position exposed to the operator adjacent the shield 131 and at the upper end of the standard 130 (as occupied by the clip means 62c in FIG. 18) and a lower, seedling supply position (as occupied by the clip means 62a in FIGS. 6, 16 and 18). Thus, as a clip passes above the shield 131 and becomes available to an operator seated in the operator seat 44, the operator may manually position a seedling S in such a clip (as illustrated in FIG. 16).

Thereafter, with fore and aft traversal of the movable frame means 47 adjacent the position of the standard 130, a pair of actuating flippers or triggers 134, 135 respectively engage a stop latch mechanism 136 and one of the contact plates 61a, 61b, 61c, 61d. The indexing triggers 134, 135 are constructed and arranged for unidirectional pushing engagement. That is, the triggers engage the respective components and push them only during aftward movement of the movable frame means 46. During forward movement of the movable frame means 46, the triggers 134, 135 pivot and are not effective for pushing engagement with the respective components. As the movable frame means 46 moves rearwardly (to the right in FIG. 7) for a planting cycle, one indexing trigger 134 engages the latch mechanism 136 for releasing the carousel 120 for rotation. At essentially the same time, the outer indexing trigger 135 engages one of the contact plates, rotating the carousel 120 through 90 degrees and positioning another clip for insertion of a seedling into the planting instrumentalities on the returning forward stroke (as illustrated in FIG. 6).

Referring now more particularly to FIGS. 33 through 39, a modification is there illustrated in which a spring biased seedling retaining finger 140 is actuated by a cam member 141 in such a manner as to assist in retention of a seedling during the planting sequence illustrated in FIGS. 35 through 39. More particularly, the finger 140 is mounted for movement about a vertical axis and is biased by an appropriate spring away from engagement with the seedling gripped between the dibble plates. At an appropriate point in the planting sequence (as particularly illustrated in FIGS. 37 and 38), the finger 140 is pivoted into engagement with the seedling by the action of a cam 141 so as to assure that the seedling is retained into position for planting. Components of the apparatus illustrated in FIGS. 33 through 39 and described hereinbove are identified in those figures by the same reference characters applied in the earlier figures, with the addition of prime notation.

In the drawings and specification, there has been set forth a preferred embodiment of the invention, and although specific terms are employed, they are used in a generic and descriptive sense only and not for purposes of limitation.

That which is claimed is:

1. A method of spot planting seedlings comprising the steps of:
   traversing ground to be planted with a carriage, while
   intermittently gripping a seedling between a pair of dibble plates mounted on a movable frame mounted on the carriage, and
   intermittently moving the dibble plates and a seedling gripped therebetween jointly vertically downwardly relative to the frame for propelling the dibble plates and seedling into a spot of ground, then
   lifting one dibble plate vertically relative to the other for separating the dibble plates and releasing the seedling in the spot of ground, while
   reducing to zero the relative fore and aft velocity between the engaged spot of ground and the dibble plates and frame by permitting free movement of the dibble plates and frame aftwardly of a horizontal longitudinal axis of said carriage, then
   compressing soil about the released seedling, then lifting the separated dibble plates from the spot of ground vertically upwardly relative to the frame, and then
   engaging an elongate flexible drive member with the frame and driving the frame and dibble plates forwardly of the horizontal longitudinal axis in preparation for a next subsequent cycle of planting, all while
   continuing to traverse ground to be planted at a predetermined, uninterrupted speed.

2. A method according to claim 1 wherein the step of intermittently moving the dibble plates vertically downwardly is preceded on each occurrence by a step of pulverizing ground at spaced spots for preparing the ground to receive planting of a seedling.

3. A method according to claim 2 wherein the step of pulverizing ground comprises penetrating and loosening soil with a rotatable pulverizer.

4. In a mobile carriage for progressive, uninterrupted movement over soil to be spot planted with transplants, said carriage bearing, in combination:
   rotatable auger means for penetrating and loosening soil and thereby for preparing ground to receive planting of a seedling,
   rotary motive means for rotating said auger means,
   dibble means for gripping a seedling and for penetrating soil prepared by said auger means and thereby for planting a seedling in the ground, the dibble means at least partially surrounding the auger means,
   linear motive means for propelling said dibble means into the ground,
   packing means for engaging the surface of the ground adjacent a location of penetration thereof by said dibble means for compressing soil about a seedling,
   packing motive means for driving said packing means into the ground,
   transport means on said carriage mounting said auger means, said dibble means, said packing means and said motive means for traversing movement across ground to be planted and for alternately reducing to zero the relative traversing velocity between each said auger, dibble and packing means and a spot of ground engaged thereby and increasing the relative traversing velocity between each said auger, dibble and packing means and the ground to be planted so as to prepare each said auger, dibble and packing means for a next subsequent cycle of planting while the carriage advances at a predetermined, uninterrupted speed.

5. Apparatus according to claim 4 wherein said auger means comprises shaft means mounted for rotation about a vertical axis and for axial vertical movement for penetration into and withdrawal from ground to be planted, and blade means mounted on said shaft means for rotation therewith and for loosening soil penetrated by said shaft means.

6. Apparatus according to claim 4 wherein said dibble means comprises first and second dibble plate members mounted for movement one relative to the other between seedling gripping engagement one with the other and seedling release separation one from the other, said plate members further being mounted for vertical movement for penetration into and withdrawal from ground to be planted.

7. Apparatus for spot planting seedlings and comprising:
   carriage means for traversing ground to be planted and having fore and aft ends,
   movable frame means mounted on said carriage means for moving fore and aft thereof,
   auger shaft means mounted on said frame means for rotation about a vertical axis and for axial vertical movement for penetration into and withdrawal from ground to be planted,
   blade means mounted on said shaft means for rotation therewith and for engaging and loosening soil penetrated by said shaft means,
   rotary motive means for rotating said shaft means,
   first and second dibble plate members mounted on said frame means for movement one relative to the other between seedling gripping engagement one with the other and seedling release separation one from the other, said plate members further being mounted for vertical movement along an axis parallel and adjacent to said shaft means axis for penetration into and withdrawal from ground to be planted, linear motive means for propelling said plate members into the ground, impacting hammer means mounted on said frame means for pivotal movement about a horizontal axis between a cocked position and a tripped position and for striking the surface of the ground adjacent a location of penetration thereof by said plate member for compressing soil about a seedling, trip motive means for driving soil hammer means into the ground, and said frame means cooperating with said means mounted thereon during engagement of said last mentioned means with the ground for reducing to zero the relative fore and aft velocity between engaged ground spots and said shaft means, said plate members, and soil hammer means by movement of said frame means aftward of said carriage means during ground engagement and seedling planting.

8. Apparatus for spot planting seedlings and comprising:

carriage means for traversing ground to be planted and having fore and aft ends, movable frame means mounted on said carriage means for moving fore and aft thereof along a horizontal longitudinal axis, frame motive means including an elongate flexible member operatively connectable with said movable frame means for driving said movable frame forwardly of said axis, said movable frame means and said frame motive means cooperating one with the other for disengagement of said frame means from said flexible member so as to permit free rearward movement of said movable frame means relative to said carriage means and for engagement of said frame means with said flexible member and selectively driven forward movement of said movable frame means relative to said carriage means, first and second dibble plate members mounted on said movable frame means for vertical movement one relative to the other between seedling gripping engagement one with the other and seedling release vertical separation one from the other, said plate members further being mounted for joint vertical movement along an axis perpendicular to said longitudinal axis for penetration into and lifting from ground to be planted, linear motive means for propelling said plate members vertically downwardly into the ground and for lifting said plate members vertically upwardly from the ground, packing means mounted on said movable frame means for movement about a horizontal axis between a withdrawn position and a tripped position and for engaging ground adjacent a location of penetration thereof by said plate members for compressing soil about a seedling, and packing motive means for driving said packing means in soil compression, said movable frame means cooperating with said means mounted thereon during engagement of said plate members and said packing means with the ground and disengagement of said movable frame means from said elongate member for reducing to zero the relative fore and aft velocity between engaged ground spots and said plate members and said packing means by movement of said frame means aftwardly of said carriage means and along said longitudinal axis during ground engagement and seedling planting, said movable frame means further cooperating with said frame motive means during disengagement of said plate members and said packing means with the ground and engagement of said movable frame means with said elongate member for moving said movable frame means forwardly of said carriage means and along said longitudinal axis in preparation for a next subsequent cycle of ground engagement and seedling planting while said carriage means advances at a predetermined, uninterrupted speed.

9. Apparatus according to claim 8 and further comprising site preparation means mounted on said frame means and operable in cooperation with said plate members for preparing ground to receive planting of a seedling.

10. Apparatus according to claim 9 wherein said site preparation means comprises rotatable auger means for penetrating and loosening soil at a spot where a seedling is to be planted and rotary motive means for rotating said auger means.

* * * * *